United States Patent
Ohsawa

(10) Patent No.: US 8,964,189 B2
(45) Date of Patent: Feb. 24, 2015

(54) THREE-DIMENSIONAL MEASUREMENT APPARATUS, METHOD FOR THREE-DIMENSIONAL MEASUREMENT, AND COMPUTER PROGRAM

(75) Inventor: Hiroyuki Ohsawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/817,410

(22) PCT Filed: Aug. 5, 2011

(86) PCT No.: PCT/JP2011/004451
§ 371 (c)(1),
(2), (4) Date: Feb. 15, 2013

(87) PCT Pub. No.: WO2012/023256
PCT Pub. Date: Feb. 23, 2012

(65) Prior Publication Data
US 2013/0155417 A1    Jun. 20, 2013

(30) Foreign Application Priority Data

Aug. 19, 2010  (JP) ................................ 2010-184195

(51) Int. Cl.
*G01B 11/24* (2006.01)
*G01B 11/25* (2006.01)
*G06T 7/00* (2006.01)

(52) U.S. Cl.
CPC ............ *G01B 11/25* (2013.01); *G01B 11/2536* (2013.01); *G06T 7/0057* (2013.01)
USPC .......................................... 356/610; 356/601

(58) Field of Classification Search
CPC ... G01B 11/2536; G01B 11/245; G01B 11/25
See application file for complete search history.

(56) References Cited

U.S. PATENT DOCUMENTS

| | | | |
|---|---|---|---|
| 2002/0050988 A1* | 5/2002 | Petrov et al. | 345/418 |
| 2006/0017720 A1* | 1/2006 | Li | 345/419 |
| 2007/0177160 A1 | 8/2007 | Sasaki | |
| 2011/0206274 A1* | 8/2011 | Tateno et al. | 382/154 |
| 2012/0105868 A1* | 5/2012 | Nomura et al. | 356/610 |

FOREIGN PATENT DOCUMENTS

| | | |
|---|---|---|
| CN | 101782375 A | 7/2010 |
| JP | 2000-337829 A | 12/2000 |
| JP | 2006-010416 A | 1/2006 |
| JP | 2007-192608 A | 8/2007 |

* cited by examiner

*Primary Examiner* — Michael P Stafira

(74) *Attorney, Agent, or Firm* — Canon USA Inc. IP Division

(57) ABSTRACT

On the basis of captured images at the time of projecting multiple-frequency slit-shaped light patterns having no overlapping edge positions onto an object, the edge portions of the slit-shaped light patterns are identified. When the edge portions overlap in the captured images of two or more slit-shaped light patterns, the reliability of the computed distance values of the positions corresponding to the edges is lowered.

29 Claims, 14 Drawing Sheets

THREE-DIMENSIONAL MEASUREMENT APPARATUS, METHOD FOR THREE-DIMENSIONAL MEASUREMENT, AND COMPUTER PROGRAM

CROSS REFERENCE TO RELATED APPLICATIONS

This application is a National Stage filing of International Application No. PCT/JP2011/004451 filed Aug. 5, 2011, which claims priority from Japanese Patent Application No. 2010-184195 filed Aug. 18, 2010, the disclosures of each of which are hereby incorporated by reference herein in their entirety.

TECHNICAL FIELD

The present invention relates to three-dimensional measurement apparatuses, methods for three-dimensional measurement, and computer programs.

BACKGROUND ART

Measurement apparatuses for three-dimensional shapes are used in an area generally referred to as robot vision, such as three-dimensional shape inspection of products, measurement of physical dimensions, assembly positioning.

There are various methods for non-contact measurement of three-dimensional shapes, and these methods have advantages and disadvantages. For example, a light section method using laser slit light, which is a method for measurement of three-dimensional shapes, has an advantage in that it can be carried out using compact components such as a scanner, a mirror, and a semiconductor laser. However, the light section method has a disadvantage in that this method requires capturing as many images as there are scan lines and, hence, is unfavorable for high-speed measurement of an object having a three-dimensional shape.

As a method to overcome such a drawback, there is a method called a space encoding method in which a three-dimensional shape is measured by projecting a slit-shaped light pattern, which is a light and dark pattern, onto an object, for space division. In the space encoding method, the number of images to be captured needs to be only ($\log_2 N$), where N is the number of divisions of space. Hence, compared with the light section method, the space encoding method allows an object with a three-dimensional shape to be measured using fewer captured images.

However, in the space encoding method, the resolution of space division is limited by the number of bits used for quantization of a projected pattern, at the time of space division.

Hence, there is a method called a multi-slit-light space measurement method in which a space encoding method is used up to a certain stage and the three-dimensional shapes of individual spatially divided regions are measured by a light section method at the same time (refer to PTL 1).

This method allows an object having a three-dimensional shape to be measured with even fewer captured images than in the light section method, and allows an object having a three-dimensional shape to be measured with higher spatial resolution than measurement using only the space encoding method.

Hitherto, the accuracy with which the three-dimensional shape of an object is measured has been improved using the principles described above.

A three-dimensional shape measurement apparatus, which measures a shape by, for example, projecting laser slit-shaped light or a slit-shaped light pattern, has a problem in, for example, detection of measurement lines on which measured values are based, depending on the capturing condition of the reflected light of projected light. In other words, detection of measurement lines may not be performed under ideal condition (diffuse reflection) and there may be specularity, depending on a bidirectional reflectance distribution function (BRDF), which expresses the reflection characteristics of light from an object. Due to this, for example, in a three-dimensional shape measurement apparatus, indirect reflection of measurement lines is measured.

In such a case, since real measurement lines (measurement lines due to direct reflection) and false measurement lines (measurement lines due to indirect reflection) are observed, the reliability of measured distance values may become low. Further, when the reflection strength of an object is low, the signal to noise ratio (S/N ratio) of measurement lines may decrease, resulting in difficulty in the observation of the object and decreased reliability of the measured distance values when numerous noise components are observed, for example.

In addition, a problem arises that depends on the state of inclination of an object when the object is viewed from the observation direction of the object. When the surface of an object is perpendicular to the light axis of the projector apparatus and camera apparatus of a three-dimensional measurement apparatus, this is considered to be a good condition as a measurement state. However, when the angle between the surface of the object and the light axis of the projector apparatus and camera apparatus of a three-dimensional measurement apparatus is changed from the state described above due to inclination, the amount of reflected light due to projection of laser slit light or a slit-shaped light pattern decreases. This results in increased noise in the observed signal and a decreased signal to noise ratio.

Further, when a distance between measurement lines becomes smaller than the pixel resolution of a camera apparatus, that is, when the measurement resolution of a slit-shaped light pattern exceeds the Nyquist frequency of the resolution of the camera apparatus, the state of measurement becomes unstable near the corresponding portion of an image.

Hence, in PTL 1, encoding errors are detected by projecting, onto an object, a light pattern for detecting an encoding error of a code indicating space division of a portion of a slit-shaped light pattern.

However, the method disclosed in PTL 1 requires, for example, projection of a new pattern to remove the influence of indirect light. This results in an increase in the number of operations of projecting a slit-shaped light pattern, although the influence of indirect light can be measured. In other words, the method disclosed in PTL 1 requires capturing images more frequently than in ordinary methods in measurement of three-dimensional shapes. Hence, the method disclosed in PTL 1 causes an increase in measurement time and makes high-speed measurement of the three-dimensional shape of an object difficult.

Further, there is a case in which a slit-shaped light pattern that has a frequency higher than the Nyquist frequency is captured due to an inclination of the light axis of a camera apparatus and a projector apparatus with respect to the surface of an object as described above, or a case in which the reflectance of an object is low. It is not easy in the method disclosed in PTL 1 to cope with a decrease in the signal to noise ratio occurring in such cases.

CITATION LIST

Patent Literature

PTL 1: Japanese Patent Laid-Open No. 2000-337829

SUMMARY OF INVENTION

The present invention has been made in consideration of the above situation, and has as its object to perform measurement of the three-dimensional shape of an object at high speed in a space encoding method.

According to the present invention, the foregoing object is attained by providing a three-dimensional measurement apparatus including: an obtaining unit configured to obtain a captured image of an object onto which pattern light having a light and dark stripe pattern is projected; an edge position detecting unit configured to detect an edge position indicating a boundary between light and dark portions of the pattern light in the captured image; an edge overlap degree detecting unit configured to detect a degree of overlap of the edge positions detected by the edge position detecting unit; and a position computing unit configured to compute a position of the object on the basis of the edge positions and the degree of overlap of the edge positions.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Preferred embodiments of the present invention will be described in detail in accordance with the accompanying drawings.

First Embodiment

First, a first embodiment will be described.

Figure 1:
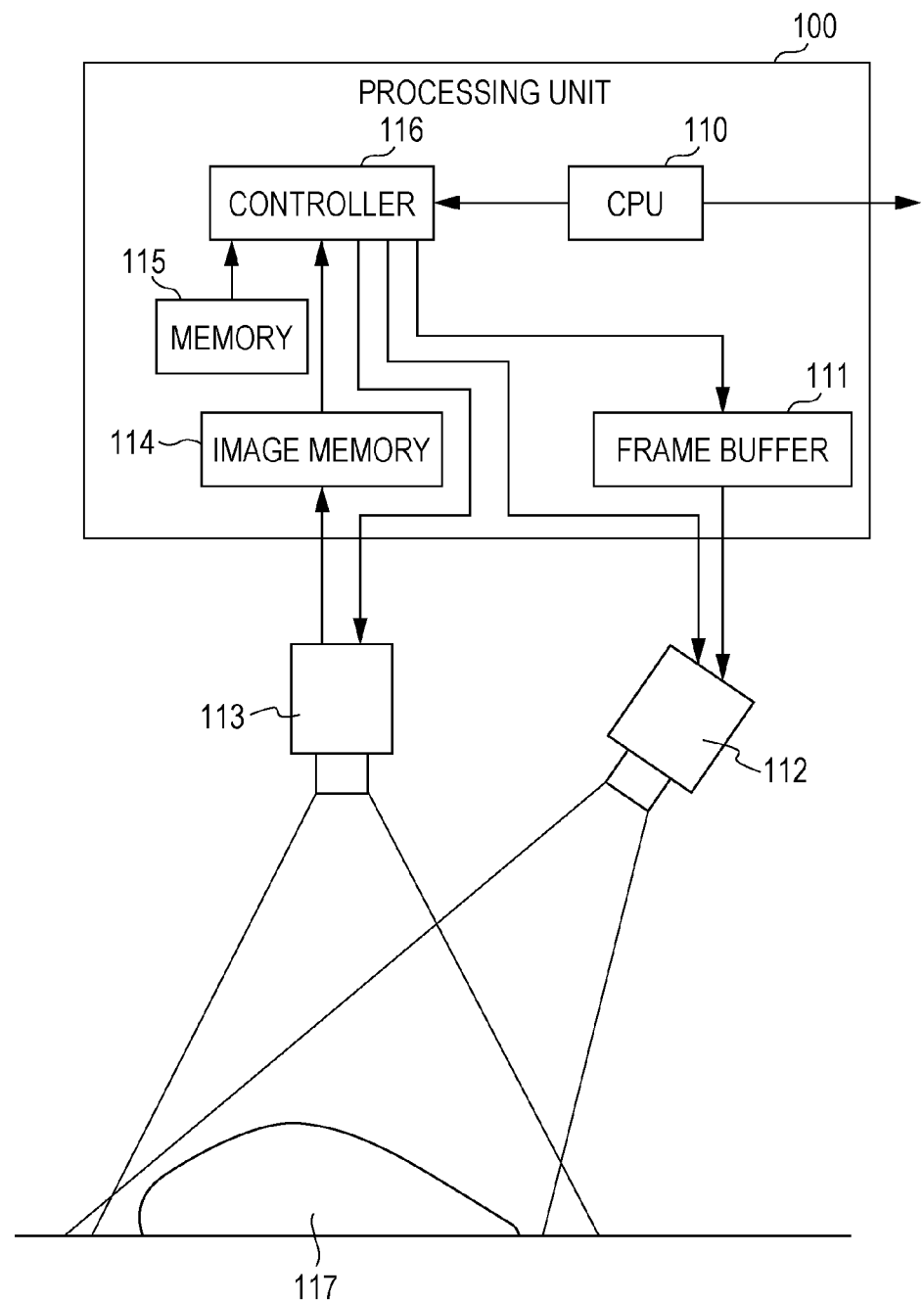
FIG. 1 illustrates a system configuration of a three-dimensional measurement system.

FIG. 1 illustrates an exemplary system configuration of a three-dimensional measurement system. The three-dimensional measurement system includes a projector 112, a camera 113, and a processing unit 100.

The projector 112 projects stripe pattern light or multi-slit pattern light onto an object 117. The camera 113 captures an image of the object 117 (pattern light or multi-slit pattern light reflected by the object 117) onto which the pattern light or multi-slit pattern light is projected. The processing unit 100 instructs projection or capturing of stripe pattern light or multi-slit pattern light and processes the captured image data and performs three-dimensional measurement of the object 117.

The processing unit 100 includes a central processing unit (CPU) 110, a frame buffer 111, an image memory 114, a memory 115, a controller 116, an output unit (not illustrated), and a display unit (not illustrated). These units are connected to one another through a bus.

The controller 116 is hardware that performs communication between itself and the memory 115, the image memory 114, the frame buffer 111, and the like, and auxiliary functions of computation. The frame buffer 111 is formed of RAMs, for example.

The CPU 110 forms projection patterns using patterns stored in the memory 115 that includes a non-volatile memory, and stores the projection patterns in the frame buffer 111.

A pattern shape program for stripe pattern light and multi-slit light and a time account program for setting a projection time and the like are stored in the memory 115 that includes a non-volatile memory.

The controller 116, upon receipt of a projection instruction from the CPU 110, transmits a stripe pattern light shape signal or a multi-slit light shape signal from the memory 115 to the projector 112 via the frame buffer 111.

The controller 116, on the basis of an instruction from the CPU 110, transmits a time account signal to the projector 112 and the camera 113. Thereby, the projection and image capturing timings of stripe pattern light or multi-slit pattern light are managed.

A plurality of pieces of image data captured by the camera 113 are temporarily stored in the image memory 114, and are input to the CPU 110 via the controller 116. The CPU 110 performs image processing such as binarization on the input image data. This binarization processing is processing for determining the position of a boundary between light and dark portions of stripe pattern light. The CPU 110, through the binarization processing, generates black and white binarized image data. The binarized image data is stored in the memory 115 and used to compute distance values in subsequent processing.

The memory 115 is formed so as to include a ROM, which is a non-volatile memory, a RAM, which is a volatile memory, and the like. The memory 115 stores apparatus dependent parameters, such as a base line length between the projector 112 and the camera 113, the focal length of the camera 113, the number of pixels of the camera 113 and external parameters, such as distortion obtained by calibration performed in advance and external light luminance. The memory 115 also stores a program for three-dimensional measurement based on triangulation.

The CPU 110 executes processing based on a three-dimensional measurement program stored in the memory 115, with binarized image data and various parameters as input, thereby performing three-dimensional measurement of the object 117.

The results of three-dimensional measurement of the object 117 performed by the CPU 110 are generated as distance image data.

The distance image data is converted into an image by the output unit (not illustrated) and displayed as a distance image by the display unit (not illustrated).

The sequence of processing described above is always performed on the basis of instructions from the CPU 110.

Note that when, for example, computation of the edge (light and dark boundary) portion of stripe pattern light at a sub-pixel accuracy level is performed, binarized image data in consideration of a sub-pixel accuracy level can be created by assuming, as the size of the image memory 114, a virtual captured image which is larger than the image captured by the camera 113.

Next, a slit-shaped light pattern to be projected will be described. In the present embodiment, space encoding based on a Gray code is described as an example of the space encoding.

Figure 2:
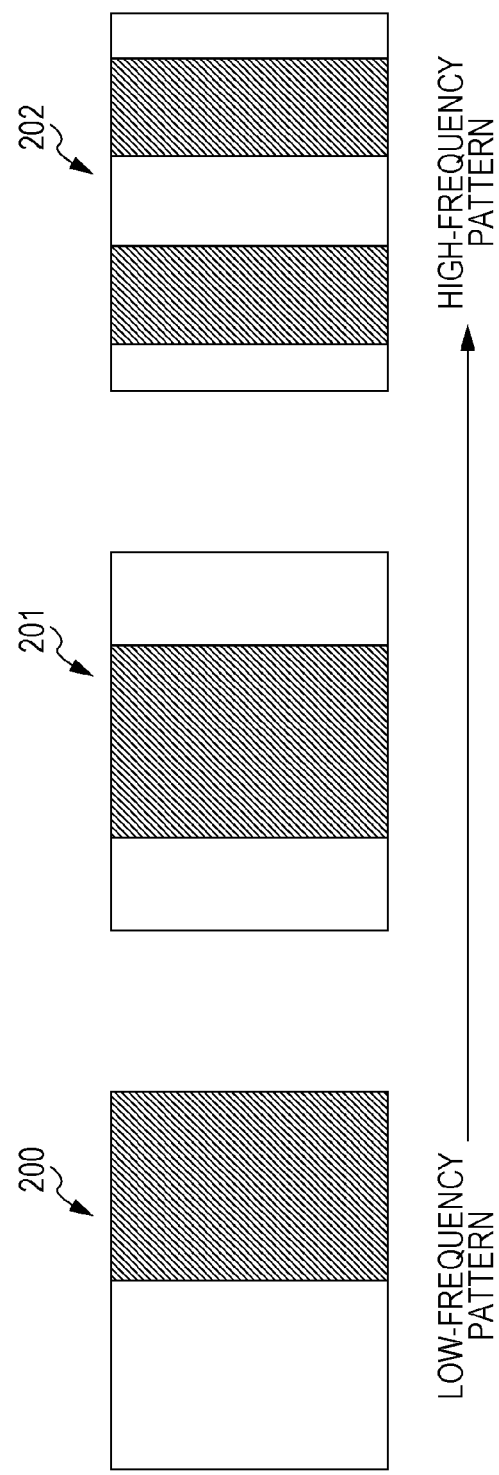
FIG. 2 illustrates exemplary slit-shaped light patterns projected onto an object.

FIG. 2 illustrates exemplary slit-shaped light patterns projected onto the object 117.

Referring to FIG. 2, slit-shaped light patterns 200 to 202 are stripe patterns which have alternately arranged light and dark slit portions.

In the examples illustrated in FIG. 2, the slit-shaped light patterns 200 to 202 based on a space encoding method represent slit and stripe pattern light based on 3-bit space encoding. Although description is made of an example in which 3-bit space encoding is used, the present embodiment is not limited to 3-bit space encoding. When N-bit encoding is used, slit-shaped light patterns are expressed by N patterns.

The slit-shaped light pattern 201 represents stripe pattern light which has twice the space resolution of the slit-shaped light pattern 200. Similarly, the slit-shaped light pattern 202 represents stripe pattern light which has twice the space resolution of the slit-shaped light pattern 201.

The slit-shaped light patterns 200 to 202 based on a space encoding method described above are projected by the projector 112 onto the object 117, and the slit-shaped light patterns 200 to 202 projected onto the object 117 are captured by the camera 113. In this manner, the processing unit 100, by dividing an image capturing area into eight divisions, can recognize the object 117.

Figure 3:
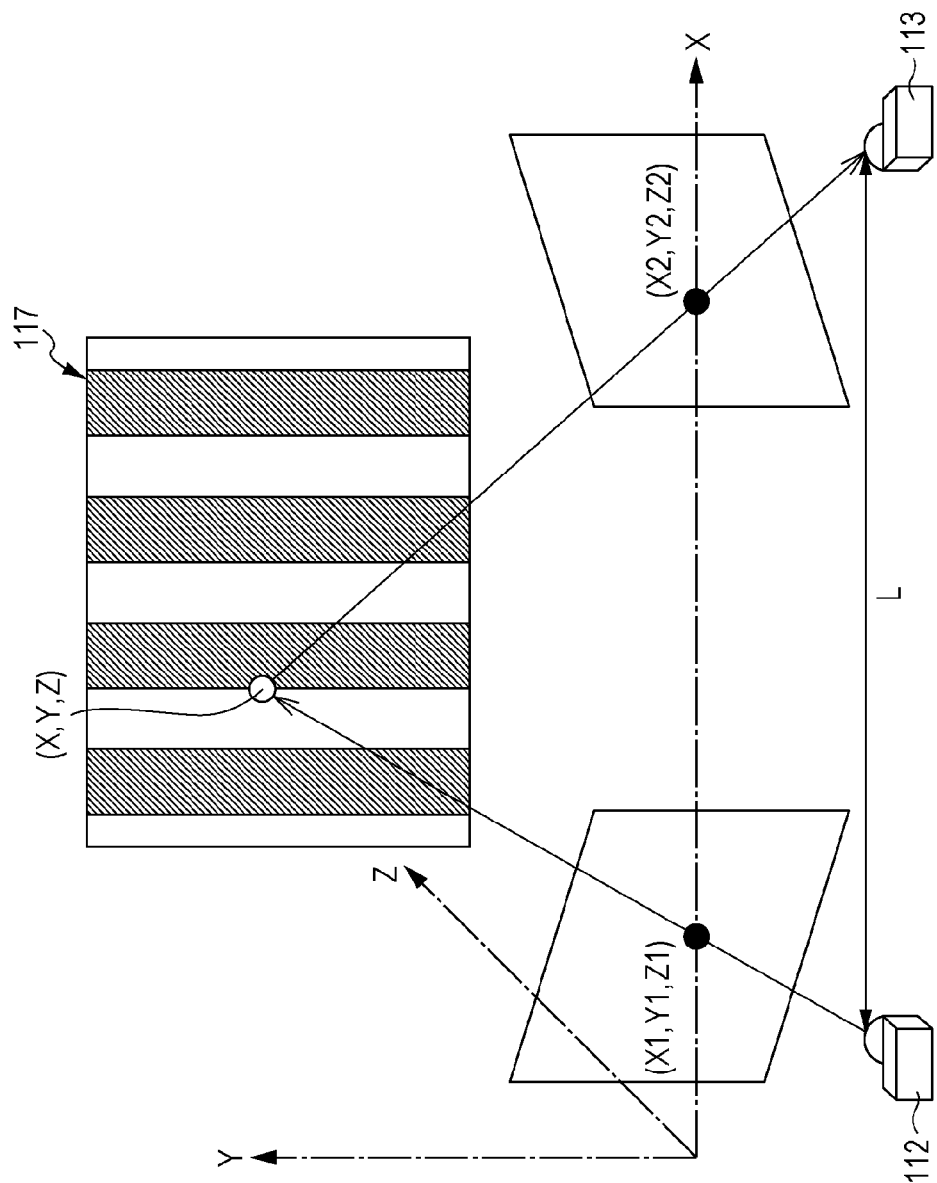
FIG. 3 illustrates an exemplary method for three-dimensional measurement performed by a three-dimensional measurement system.

FIG. 3 conceptually illustrates an exemplary method for three-dimensional measurement performed by a three-dimensional measurement system.

The slit-shaped light patterns 200 to 202 formed of stripe patterns in which light and dark portions are alternately arranged with predetermined cycles are projected by the projector 112 onto the object 117.

The stripe patterns (shapes and sizes) of the slit-shaped light patterns 200 to 202 are determined in advance, and are sequentially and individually projected onto the object 117. Every time each pattern is projected, the slit-shaped light pattern projected onto the object 117 is captured by the camera 113 and is obtained by the processing unit 100 as image data.

Referring to FIG. 3, it is assumed that the boundary position of light and dark portions of the object 117 is (X, Y, Z) and that the position of the light of the projector 112 when the boundary position (X, Y, Z) and the projector 112 are connected to each other by a straight line is (X1, Y1, Z1). Further it is assumed that the position of the light of the camera 113 when the boundary position (X, Y, Z) and the camera 113 are connected to each other by a straight line is (X2, Y2, Z2). The position (X2, Y2, Z2) of the light of the camera 113 is determined by the plane coordinates of the pixel of the image sensor (for example, CCD or CMOS) of the camera 113. The position (X1, Y1, Z1) of the light of the projector 112 is determined by the plane coordinates of the pixel of the light projecting device (for example, liquid crystal device).

A length L between the projector 112 and the camera 113 is the base line length. The base line length L is determined by the configuration conditions of the apparatuses. The boundary position (X, Y, Z) of the object 117 can be determined by these parameters on the basis of the principle of triangulation. The three-dimensional shape of the object 117 can be measured by obtaining the boundary positions (X, Y, Z) over the whole surface of the object 117. Note that obtaining of the boundary positions (X, Y, Z) over the whole surface of the object 117 and the measurement of the three-dimensional shape of the object 117 can be realized using publicly known techniques, and the detailed description thereof is omitted here.

The outline of a technique proposed in the present embodiment will now be described.

Figure 4:
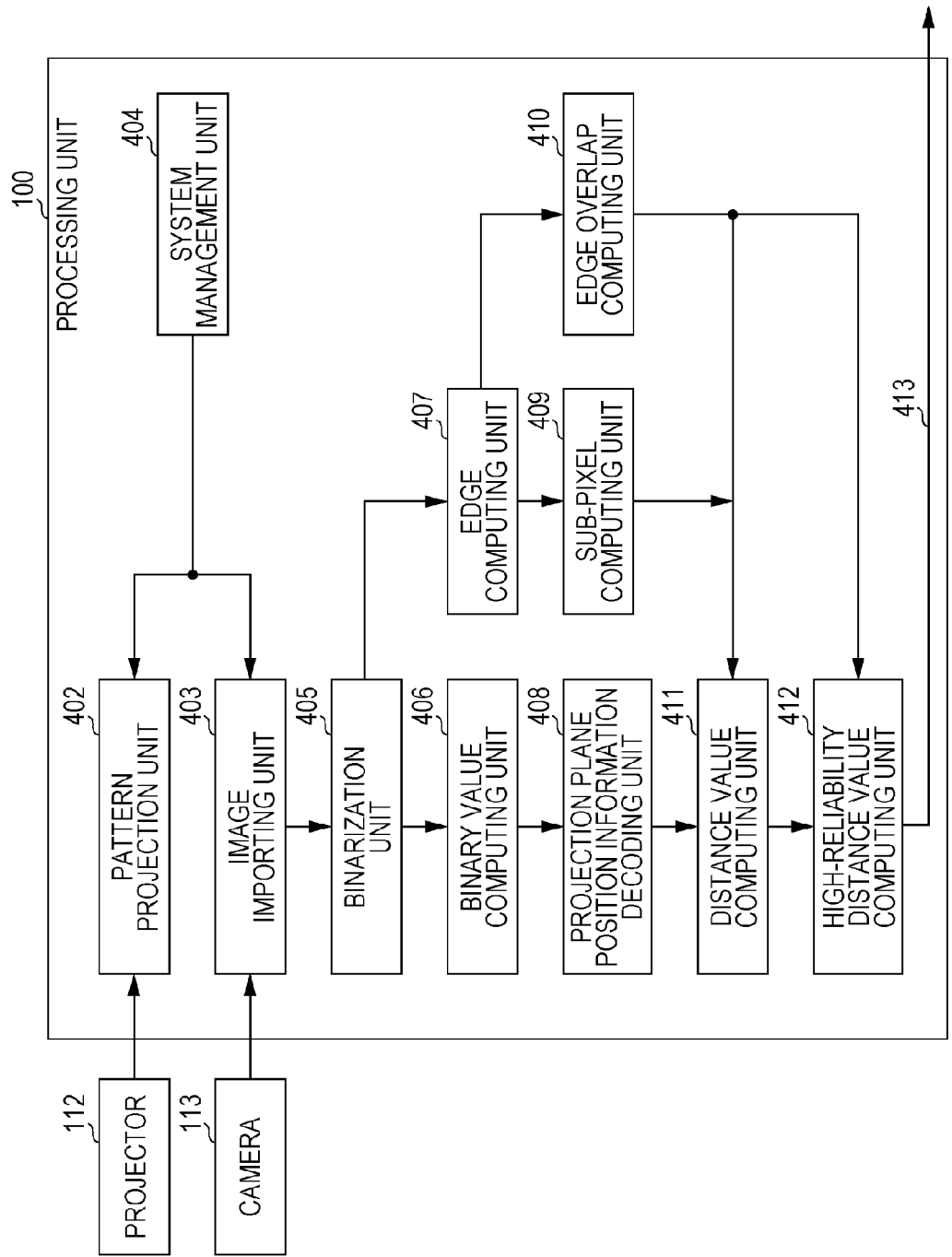
FIG. 4 illustrates a software configuration of a processing unit of a three-dimensional measurement system.

FIG. 4 illustrates an exemplary software configuration of the processing unit 100 of a three-dimensional measurement system.

The processing unit 100 is realized by software components denoted by 402 to 412. These software components correspond to programs executed by hardware such as the CPU 110, the frame buffer 111, the image memory 114, the memory 115, the controller 116, and the like illustrated in FIG. 1. Note that although these components are described as software in the present embodiment, part or all of these components may be realized using hardware for execution or processing. After all, outputting distance image data 413 using these software components is the object of all of the software components.

The distance image data 413 is data formed of a two-dimensional array obtained by computing distance values for each of the pixels of an image captured by the camera 113. The distance image data 413 is three-dimensional space information which has a distance value from the camera 113 to the object 117 as a value of each pixel.

First, the entirety of the three-dimensional measurement system is controlled by a system management unit 404. Although FIG. 4 illustrates that the system management unit 404 controls only a pattern projection unit 402 and an image importing unit 403, other blocks are actually also managed by the system management unit 404.

The system management unit 404 performs resource and time management of the entirety of the three-dimensional measurement system, such as management of the timings of projecting slit-shaped light patterns and the timings of capturing images, management of the order in which computation is to be performed, and management of output data.

The pattern projection unit 402 generates slit-shaped light patterns to be projected by the projector 112. The generated slit-shaped light patterns are projected by the projector 112.

The image of the object 117 at this time is captured by the camera 113 and is imported by the image importing unit 403 into the apparatus (processing unit 100).

This processing for projection and capturing of slit-shaped light patterns is performed by projection of, for example, the slit-shaped light patterns 200 to 202 illustrated in FIG. 2 and capturing of the image.

Figure 5:
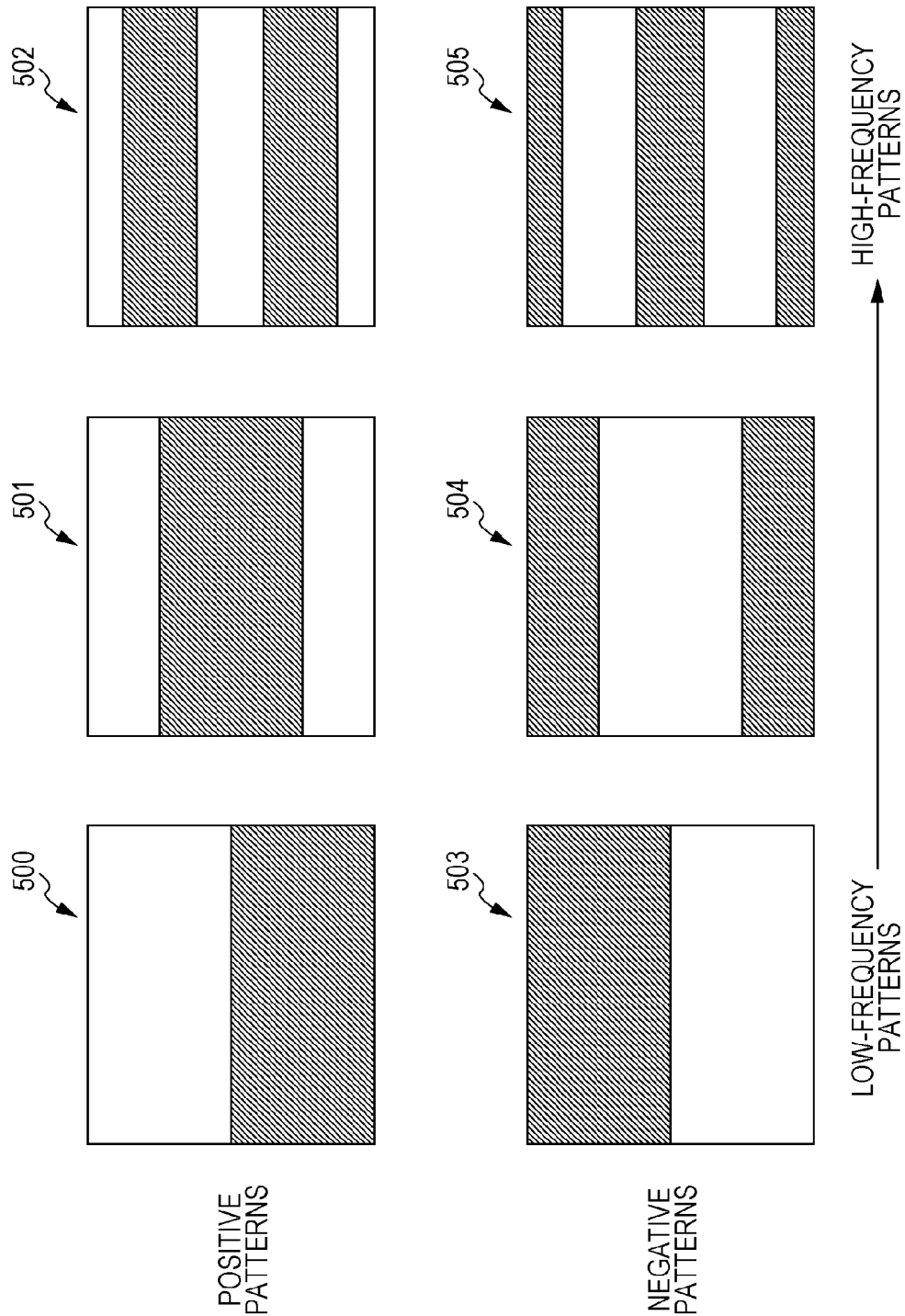
FIG. 5 illustrates other examples of slit-shaped light patterns to be projected onto an object.

The slit-shaped light patterns of the method of the present embodiment may be vertical patterns illustrated in FIG. 2 or horizontal patterns illustrated in FIG. 5 for the proper operation of the system. Note that in the description below, the case in which the horizontal patterns illustrated in FIG. 5 are used rather than the vertical patterns illustrated in FIG. 2 is described as an example.

This selection of patterns is determined by the positional relationship between the camera 113 and the projector 112.

If the camera 113 and the projector 112 are arranged so as to be separated in the vertical direction (Y-direction in the example illustrated in FIG. 3), horizontal patterns are used as the slit-shaped light patterns. On the other hand, if the camera 113 and the projector 112 are arranged so as to be separated in the horizontal direction (X-direction in the example illustrated in FIG. 3), vertical patterns are used as the slit-shaped light patterns.

Referring to FIG. 2, slit-shaped light patterns based on a Gray code are used as the slit-shaped light patterns, and a plurality of low- to high-frequency slit-shaped light patterns in accordance with the number of bits appropriate for dividing space are used.

A binarization unit 405 divides each of the captured images of the object 117 into a region onto which slit-shaped light patterns are projected and a region onto which slit-shaped light patterns are not projected. For example, region division can be performed by dividing information regarding the luminance of the captured images of the object 117 in accordance with a threshold determined by a threshold determination method, such as the Ohtsu method. The binarized information obtained by the binarization unit 405 is sent to an edge computing unit 407.

The edge computing unit 407 computes detailed position information (hereinafter, called "edge position information", as needed) regarding portions of a slit-shaped light pattern changing between light and dark, on the basis of the binarized information output from the binarization unit 405.

The edge computing unit 407 sends the edge position information to a sub-pixel computing unit 409.

The sub-pixel computing unit 409 computes more detailed coordinate data as the information regarding edge positions on the basis of luminance change information regarding pixels near the edges. At this time, the information regarding edge positions can be made to be coordinate values with sub-pixel accuracy, rather than pixel accuracy in units of the pixels of the camera 113 or units of the projection pixels of the projector 112.

The edge computing unit 407 sends the edge position information to an edge overlap computing unit 410.

The edge overlap computing unit 410 counts the number of overlapping edges of slit-shaped light patterns in each image capturing pixel, for each of the frequencies of the slit-shaped light patterns described above. In the present embodiment, when a plurality of edge positions exist in a pixel of an image sensor, the edge overlap computing unit 410 determines that the edge positions are overlapping.

The binarization unit 405 sends the binarized information also to a binary value computing unit 406.

The binary value computing unit 406 integrates the binarized images, at respective frequencies, generated from the images of the object 117 onto which a plurality of low-to high-frequency slit-shaped light patterns are individually projected. Thereby, the binary value computing unit 406 generates an image in which position information (hereinafter, called "disparity map data", as needed) in the projected image made by the projector 112 is encoded.

In a space encoding method, in general, disparity map data has been encoded using a code called a Gray code. Hence, a projection plane position information decoding unit 408 decodes the disparity map data encoded with a Gray code, and computes disparity map data which is not encoded.

By using this disparity map data, the relationship between the coordinates in the projection plane of the projector 112 and the coordinates in the image captured by the camera 113 is obtained.

A distance value computing unit 411 receives the Gray code of the disparity map data decoded by the projection plane position information decoding unit 408, information regarding the edge positions obtained by the sub-pixel computing unit 409, and the count of overlapping edges obtained by the edge overlap computing unit 410. The distance value computing unit 411, upon receipt of these computing results, computes distance image data.

In the space encoding method, on the basis of the correspondence relationship between the coordinates in the projection plane of the projector 112 and the coordinates in the image captured by the camera 113, distance image data at each position on the object 117 can be obtained using a triangulation method. Particularly, in the method of the present embodiment, the sub-pixel computing unit 409 computes the edge positions of slit-shaped light patterns with sub-pixel accuracy which is higher than accuracy in units of image pixels. Hence, the positions in three-dimensional space of the object 117 can be computed with very high accuracy. Note that a method of computing distance image data is realized by a publicly known technique, and the detailed description thereof is omitted.

Then, the distance image data (computation results of the distances to the object 117) obtained by the distance value computing unit 411 is sent to a high-reliability distance value computing unit 412.

The high-reliability distance value computing unit 412 identifies portions where the positions of the edges of the slit-shaped light patterns are overlapping on the basis of the count value computed by the edge overlap computing unit 410. Then, the high-reliability distance value computing unit 412 determines that the distance image data at these portions is inaccurate, and clears the corresponding distance values.

Note that detailed processing for determining, on the basis of information regarding the portions where the positions of the edges are overlapping, that the distance image data at the corresponding portions is inaccurate and processing for clearing the corresponding distance values will be described later.

Finally, the high-reliability distance value computing unit 412 reconfigures the distance image data 413 by using distance image data which have been determined to be not inaccurate.

FIG. 5 illustrates other examples of slit-shaped light patterns to be projected onto an object. As described before, FIG. 5 illustrates slit-shaped light patterns having horizontal patterns, as the slit-shaped light patterns.

FIGS. 6 to 10 illustrate examples of the case in which the camera 113 and the projector 112 are arranged so as to be separated in the vertical direction. Hence, in FIGS. 6 to 10, the count of the overlapping edge positions of slit-shaped light patterns is computed by projecting the horizontal slit-shaped light patterns (horizontal patterns) illustrated in FIG. 5 onto an object 601. Note that in the description below, this count value is called an "edge overlap value", as needed.

In FIGS. 6 to 10, similarly to the example illustrated in FIG. 2, the image of the object 601 is captured for each of a plurality of low- to high-frequency slit-shaped light patterns 500 to 505 which are sequentially projected onto the object 601.

Computation of the edge portions of slit-shaped light patterns described above is performed as follows, for example. That is, computation of the positions of the edge portions of the slit-shaped light patterns are computed on the basis of luminance gradient information regarding an image captured by using the stripe projection pattern (positive pattern) 500 and an image captured by using the stripe projection pattern (positive pattern) 503.

Also in the example illustrated in FIG. 5, similarly to the example illustrated in FIG. 2, slit-shaped light patterns are projected in a state in which position information of the projection plane is encoded using a 3-bit Gray code.

The number of bits used for a high-frequency pattern (high-frequency slit-shaped light pattern) is determined by the resolution of the projection pixels of the projector 112. For example, when the resolution of the projection pixels of the projector 112 is 1024×768 and horizontal patterns are projected, the required number of bits for the high-frequency pattern is 10.

Figure 6:
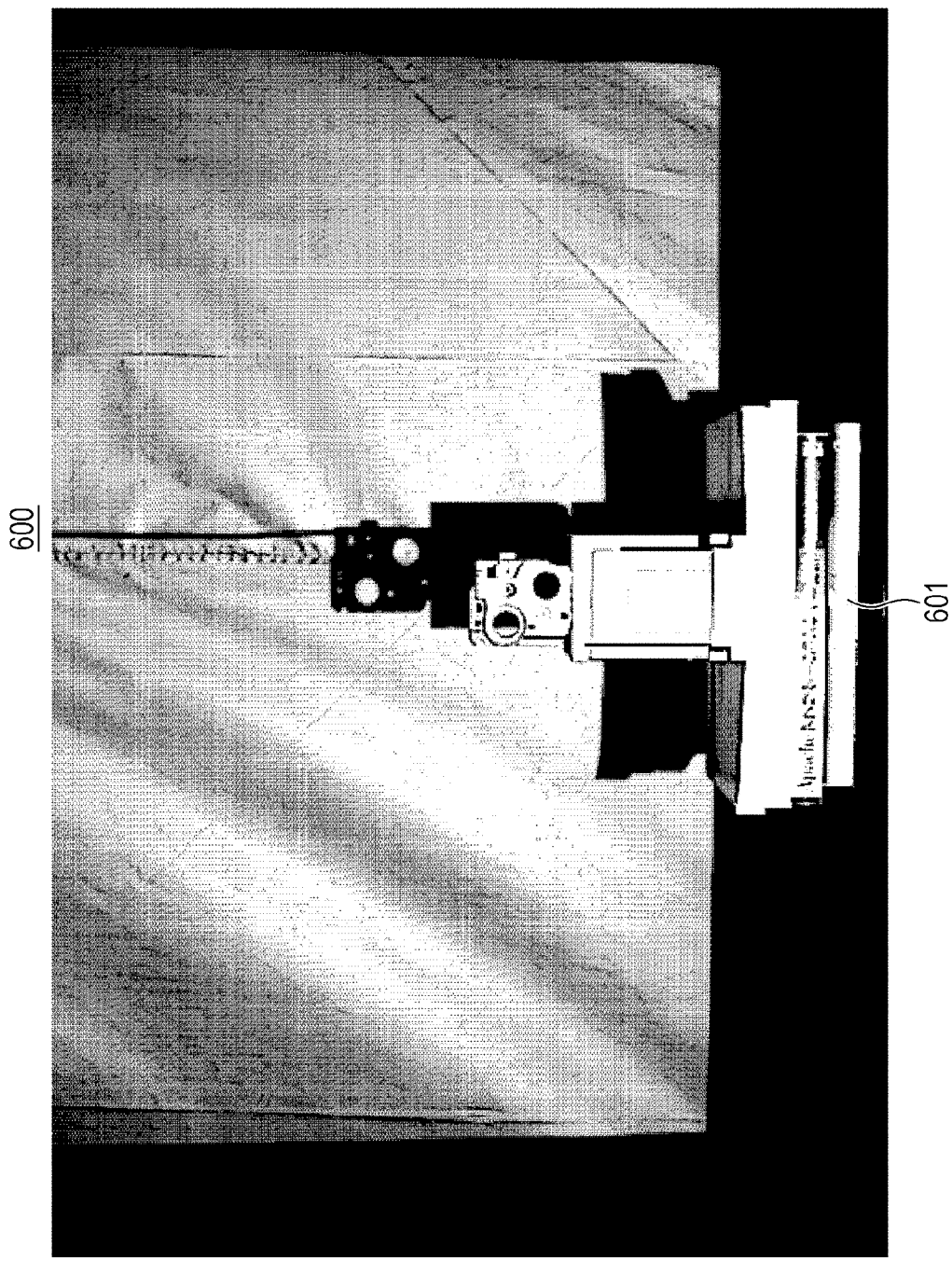
FIG. 6 illustrates an actually captured image of an object.

FIG. 6 illustrates an example of an actually captured image of an object. The object 601 whose image is captured by the camera 113 at the time of projecting a slit-shaped light pattern can be divided into a region with relatively high luminance and a region with relatively low luminance. This processing is performed by the binarization unit 405.

Processing for projecting slit-shaped light patterns and capturing the image of the slit-shaped light patterns is repeated as many times as is required for necessary resolution, and every time the processing is repeated, edge positions obtained from the captured images are stored. This is performed by the edge computing unit 407 described above.

In the example illustrated in FIG. 6, the object 601 to be measured exists in an captured image 600. FIG. 6 illustrates the captured image 600 in a state in which slit-shaped light patterns are projected onto the object 601. Exemplary computation of edge portions illustrated in FIGS. 7 to 10 was performed for the object 601.

Figure 7:
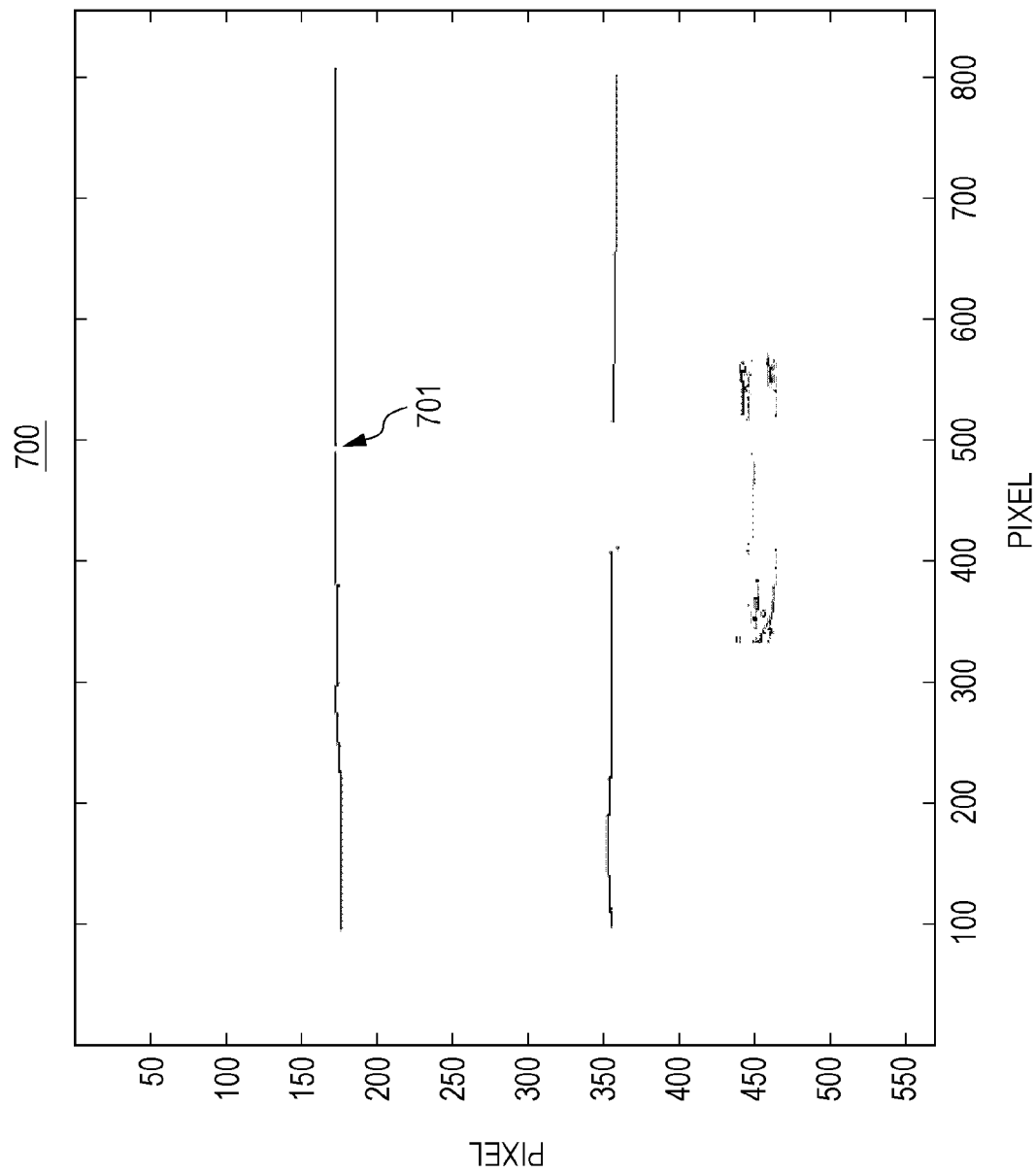
FIG. 7 illustrates computation results of edge positions obtained by projection of a low-frequency slit-shaped light pattern.

FIG. 7 illustrates an example of the computation results of edge positions obtained by projection of a low-frequency slit-shaped light pattern.

Edge computation values 700 illustrate all of the computation results of the edge positions obtained by projection of the low frequency slit-shaped light pattern. The edge computation values 700 are a result computed from the stripe projection pattern (positive pattern) and stripe projection pattern (negative pattern) described above.

The edge computation values 700 illustrate an edge portion 701 corresponding to a luminance change in the slit-shaped light pattern.

The edge computing unit 407 stores the value (edge position information) of the edge portion 701 in the memory 115. The value (edge position information) of the edge portion 701 is used by the edge overlap computing unit 410.

Figure 8:
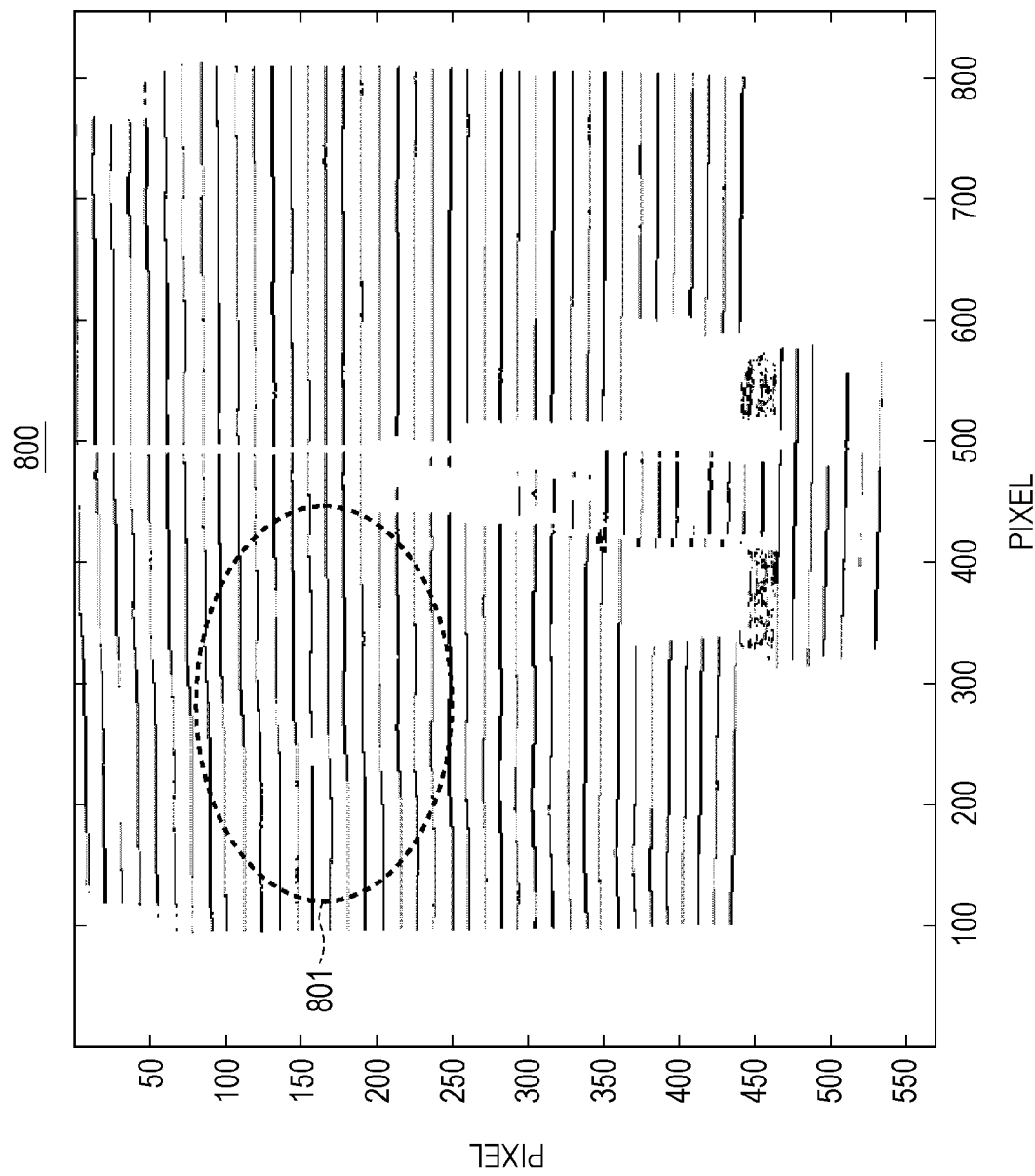
FIG. 8 illustrates computation results of edge positions obtained by projection of a middle-frequency slit-shaped light pattern.

FIG. 8 illustrates an example of the computation results of edge positions obtained by projection of a middle-frequency (intermediate-frequency) slit-shaped light pattern.

Compared with the edge computation values 700, edge computation values 800 illustrate all of the computation results of the edge positions obtained by projection of a higher-frequency slit-shaped light pattern. When an intermediate slit-shaped light pattern is projected on the object 601, computation of the edge potions is possible for higher frequencies, as illustrated by edge portions 801, compared with the edge portion 701 illustrated in FIG. 7.

Figure 9:
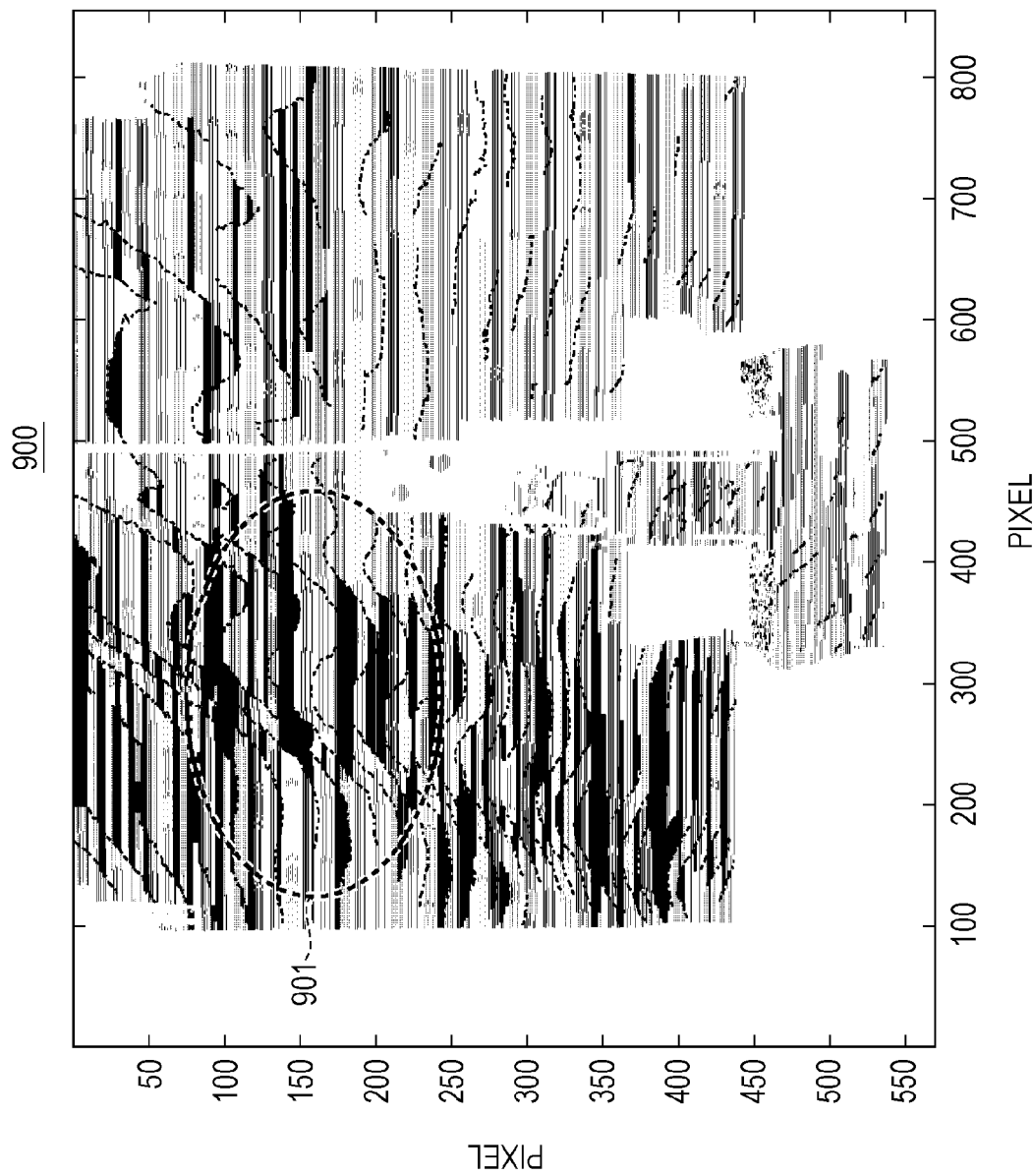
FIG. 9 illustrates computation results of edge positions obtained by projection of a high-frequency slit-shaped light pattern.

FIG. 9 illustrates an example of the computation results of edge positions obtained by projection of a high-frequency slit-shaped light pattern.

Edge computation values 900 illustrate an example of the computation results of edge positions when the space frequency of the pixels of the projector 112 has been encoded using 10 bits. When a high-frequency slit-shaped light pattern is projected onto the object 601, computation of the edge potions is possible for higher frequencies, as illustrated by edge portions 901, compared with the edge portion 701 illustrated in FIG. 7 and the edge portions 801 illustrated in FIG. 8.

Figure 10A:
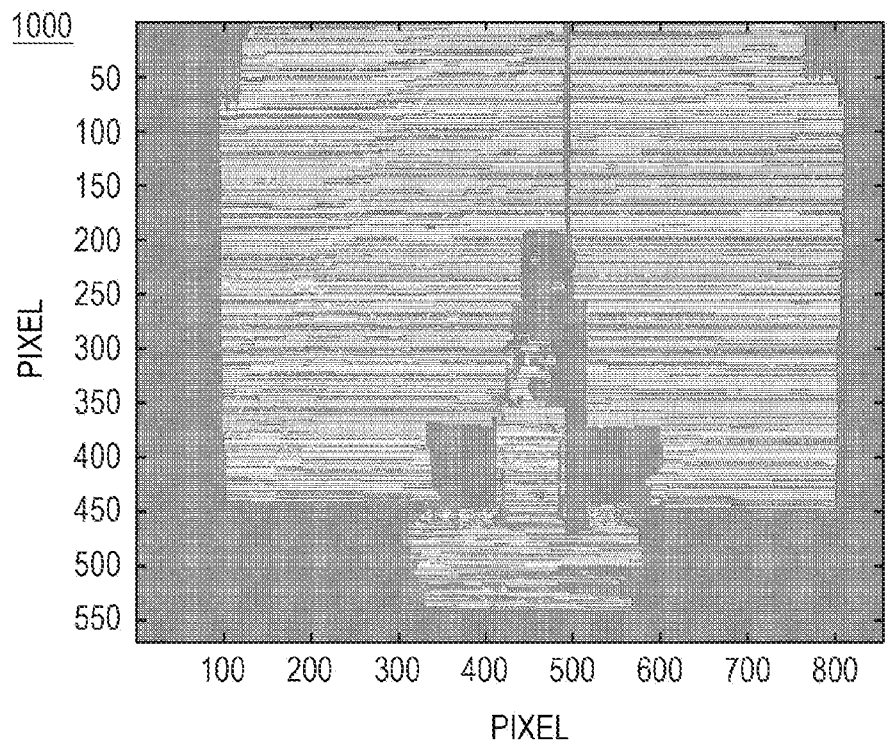
FIG. 10A illustrates computation results of edge overlap values.
Figure 10B:
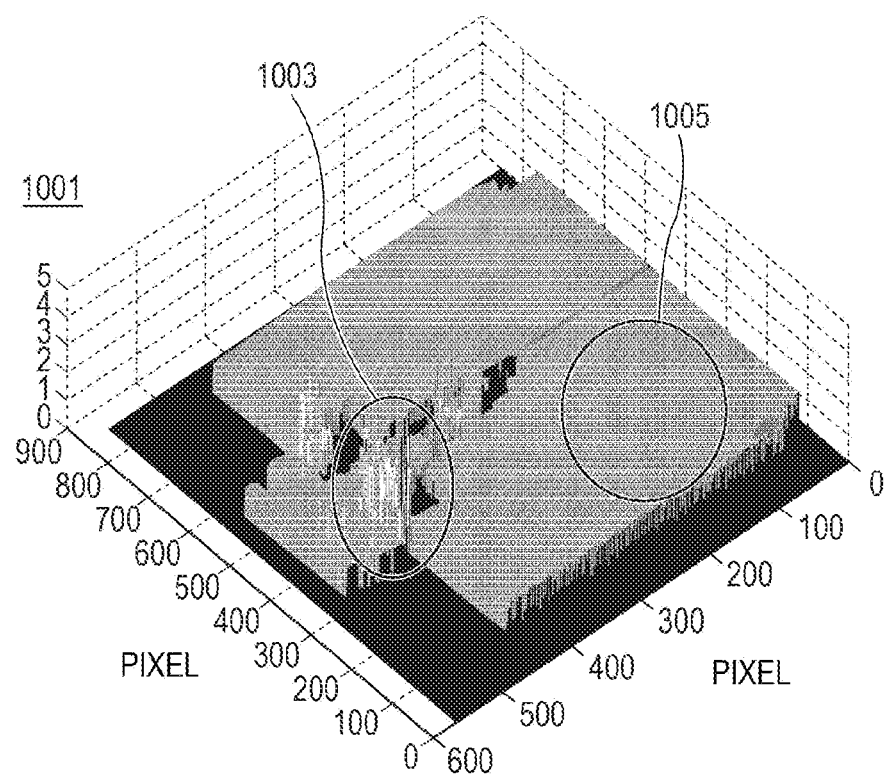
FIG. 10B illustrates computation results of edge overlap values.

FIGS. 10A and 10B illustrate exemplary computation results of edge overlap values.

The edge computing unit 407, as illustrated in FIGS. 7 to 9, obtains edge position information from captured images at the time when slit-shaped light patterns with respective frequencies are projected onto the object 601. The edge overlap computing unit 410 computes an edge overlap value by counting the occurrences of edges at a location corresponding to the same pixel of the camera 113 on the basis of edge position information obtained from the slit-shaped light patterns with respective frequencies.

Computation results 1000 of edge overlap values illustrated in FIG. 10A illustrate edge overlap values at respective pixel positions of the camera 113. Computation results 1001 of edge overlap values illustrated in FIG. 10B illustrate a three-dimensional graph in which the edge overlap values of the respective pixels of the computation results 1000 are represented in the height direction.

Image positions (area) 1002 having some edge overlap values illustrated in FIG. 10A and image positions (area) 1003 having some edge overlap values illustrated in FIG. 10B are the same position, and are positions having an edge overlap value of two or more. Image positions (area) 1004 having some edge overlap values illustrated in FIG. 10A and image positions (area) 1005 having some edge overlap values illustrated in FIG. 10B are the same position, and are positions having an edge overlap value of one.

The high-reliability distance value computing unit 412 determines that an area having an edge overlap value of one is an area of the distance image data in which the reliability of distance computation values at the same position is high. On the other hand, the high-reliability distance value computing unit 412 determines that an area having an edge overlap value of two or more is an area of the distance image data in which the reliability of distance computation values at the same position is low. In this manner, by evaluating edge overlap values, the high-reliability distance value computing unit 412 can extract portions of the distance image data, obtained by the distance value computing unit 411, having low reliability in distance values, and thereby make the portions be not output as the distance image data 413.

The relationship between the edge overlap value and the reliability of the distance image data will now be described.

In general, in a space encoding method, projection is performed by encoding the coordinate positions in the projection plane of a projector apparatus using a Gray code. Hence, at the time of projection, the respective edge positions in the projection planes of slit-shaped light patterns are completely parallel with one another and do not overlap. This is because a Gray code is characterized by the fact that the edge positions of low-frequency components and the edge portions of higher-frequency components do not overlap. Also in the examples of projecting the Gray code slit-shaped light patterns illustrated in FIGS. 2 and 5, the edge positions at which light and dark portions are switched in slit-shaped light patterns of respective frequencies do not overlap at any of low-, intermediate-, and high-frequencies.

Hence, the edge positions observed in the images of an object captured by a camera apparatus do not overlap, except for in the following cases, for example: the case in which there is an influence of indirect light, the case in which there is occlusion, the case in which the inclination of an object surface is too large for a camera apparatus to resolve the edges of slit-shaped light patterns, and the case in which the reflectance of the object is low, thereby causing a decrease in the signal to noise ratio.

Hence, it can be determined that portions of the distance image data having an edge overlap value of one satisfy the conditions of the algorithm of a space encoding method and have high reliability. On the other hand, it is difficult to determine that portions of the distance image data having an edge overlap value of two or more satisfy the conditions of the algorithm of a space encoding method, and these portions can be determined to have low reliability.

It can be said that an area having an edge overlap value of two or more is under the influence of indirect light, occlusion, noise due to a decrease in signal to noise ratio (S/N ratio), or the like, as described above.

In the present embodiment, projection of a special slit-shaped light pattern for measuring the influence of reflection of indirect light or the influence of noise caused by a decrease in signal to noise ratio, as is described in PTL 1, is not required, and three-dimensional shapes can be measured using captured images which are the same as those used by an ordinary space encoding method. Hence, there is no increase in the number of image capturing operations, and the influence of reflection of indirect light or the influence of a decrease in the signal to noise ratio can be eliminated while keeping an image capturing speed similar to that of an ordinary space encoding method.

Figure 11:
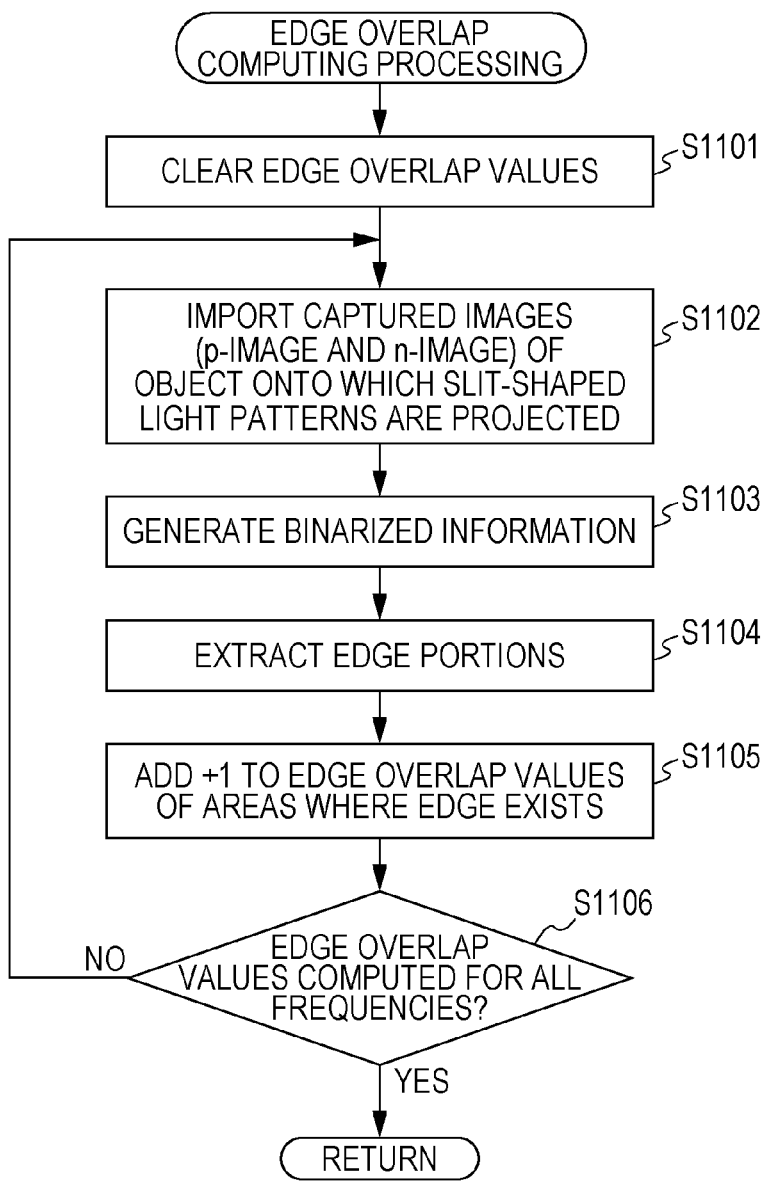
FIG. 11 is a flowchart illustrating edge overlap computing processing.

FIG. 11 is an exemplary flowchart illustrating edge overlap computing processing.

First, in step S1101, the edge overlap computing unit 410 clears edge overlap values.

Then, in step S1102, the image importing unit 403 imports a captured image (p-image) at the time of projection of the positive pattern of a slit-shaped light pattern and a captured image (n-image) at the time of projection of the negative pattern of the slit-shaped light pattern, for each of the low to high frequencies. Note that the captured images are received one by one in step S1103.

Then, in step S1103, the binarization unit 405 performs binarization processing on the captured images imported in step S1102 and generates binarized data.

Next, in step S1104, the edge computing unit 407 extracts edge portions on the basis of the binarized data and generates edge position information. In step S1104, the edge computation values 700, 800, and 900 illustrated in FIGS. 7 to 9 are obtained.

Then, in step S1105, the edge overlap computing unit 410 adds "1" to edge overlap values corresponding to portions (areas) where edges exist. The details of addition processing for the edge overlap values have been described with reference to FIG. 10.

Then, in step S1106, the system management unit 404 determines whether or not the addition processing for the edge overlap values has been performed for all the frequencies of the slit-shaped light patterns. If the addition processing for the edge overlap values has not been performed for all the frequencies of the slit-shaped light patterns, the flow goes back to step S1102, where captured images corresponding to the next frequency are imported.

The processing of steps S1102 to S1106 is repeated until addition processing for the edge overlap values are performed for all the frequencies of the slit-shaped light patterns.

When addition processing for the edge overlap values have been performed for all the frequencies of the slit-shaped light patterns, computation of the edge overlap values is completed, and the processing of the flowchart illustrated in FIG. 11 is finished. Thereby control returns from the processing. In this manner, edge overlap is computed.

Influence of Occlusion

Figure 12:
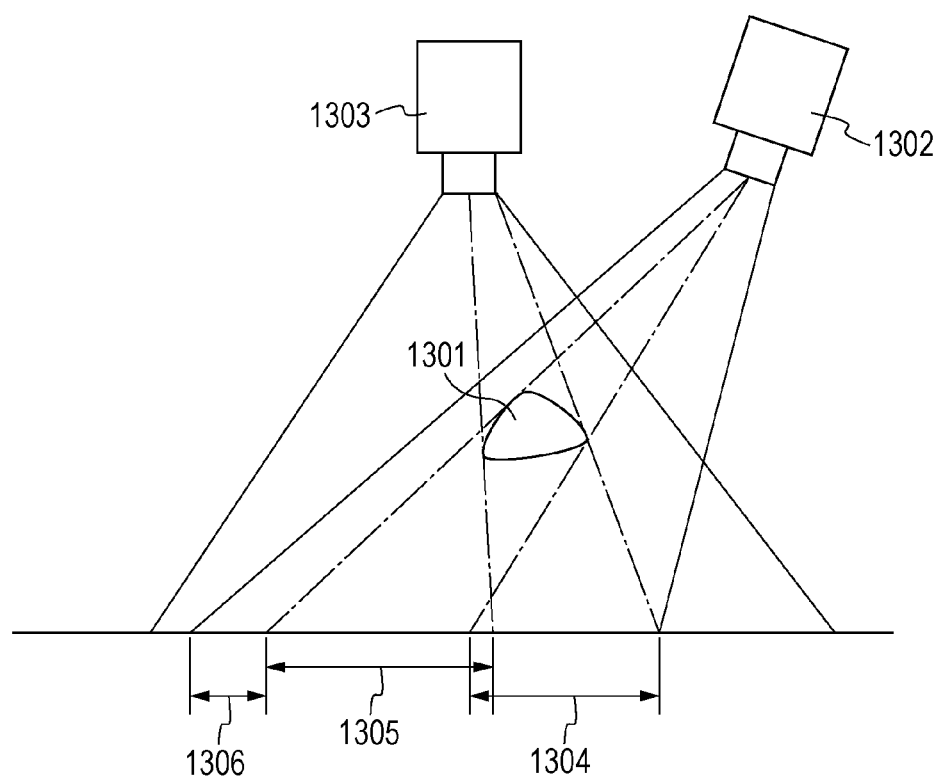
FIG. 12 illustrates exemplary influence of occlusion.

Here, the influence of occlusion in the present embodiment will be described. The influence of occlusion is seen when projection light from a projector is near a shadow (occlusion) with no light from the projector. Referring to FIG. 12, occlusion is described. Reference numerals 1301, 1302, and 1303 respectively denote an object, a camera, and a projector.

Light projected by the projector 1303 is blocked by the object 1301. In an area 1304, which is a shadow portion, a pattern cannot be captured by the camera 1302. However, since the object 1301 has inclination, light at the edge portion of the area 1304 has luminance corresponding to the sum of environment illumination and weak pattern light.

Since this is a state in which weak pattern light is projected onto a narrow area, the area 1304 is difficult to identify. Hence, it is likely that the edge of a high-frequency pattern of pattern light and the edge of a low-frequency pattern of the pattern light are in the same capturing pixel area, resulting in an increase in edge overlap value. An area 1305 is a portion onto which projection light is projected, although not captured by the camera 1302.

Regarding this portion, the surface of the object 1301 is captured by the camera 1302, and light patterns are normally projected by the projector 1303.

An area 1306 is also a floor surface, but this is a portion onto which pattern light is projected and which is captured by the camera 1302.

At this time, discontinuity of measurement lines or edge overlapping occurs at the boundary portion between the area 1305 and the area 1306. Hence, the corresponding edge overlap values increase.

As described above, portions having an edge overlap value of two or more are considered to be portions under the influence of indirect light, occlusion, noise caused by a decrease in signal to noise ratio (S/N ratio), or the like.

That is, edge overlap value map data of the whole image can be considered to be a map, or reliability map data, indicating the reliability of the edges of slit-shaped light patterns detected by pattern light.

Note that the method according to the present embodiment does not require projection of special slit-shaped light patterns for measuring the influence of reflection of indirect light, or the influence of noise caused by a decrease in signal to noise ratio (S/N ratio), compared with the technique disclosed in PTL 1. Hence, this method can be realized by computation using captured images which are the same as those used in an ordinary space encoding method. As a result, there is no increase in the number of image capturing operations, and the influence of reflection of indirect light or the influence of a decrease in the signal to noise ratio can be eliminated while keeping an image capturing speed similar to that of an ordinary space encoding method.

Method of Computing Edges

Figure 13:
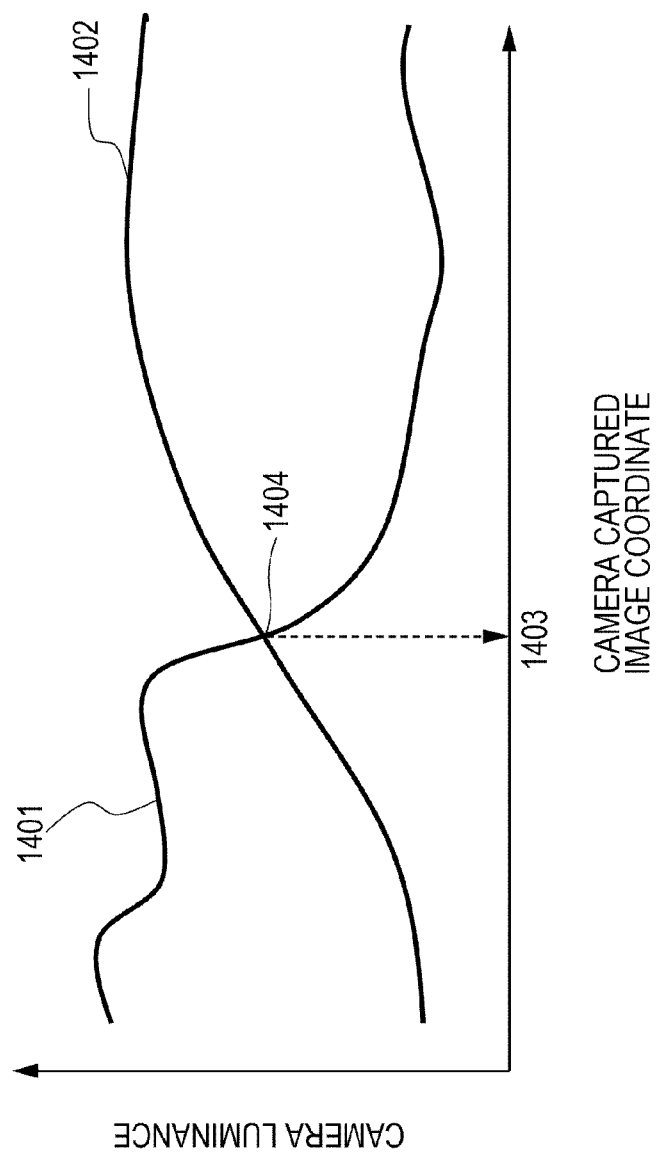
FIG. 13 illustrates computation of edge coordinates.

Here, a method of computing edges in the present embodiment will be described. FIG. 13 illustrates a method of computing edges in the present embodiment.

Edges can be computed by means of two captured images, one using a positive pattern and the other using a negative image. FIG. 13 is a graph illustrating the luminance distribution of captured images of projected patterns. Although the captured image is represented by two-dimensional data, FIG. 13 illustrates data of the vertical direction of the image as one-dimensional data.

The horizontal axis represents the vertical coordinates of captured images, and the vertical axis represents the strength of luminance of the images. A luminance change curve 1401 represents change in the luminance of a captured image corresponding to positive-pattern projection. A luminance change curve 1402 represents change in the luminance of a captured image corresponding to negative-pattern projection. The change in luminance illustrated in FIG. 13 is a magnified view of a local portion where a change in pattern occurs. The luminance change curve 1401 and the luminance change curve 1402 have the same luminance value in a pattern changing portion 1404. By computing this point 1404 as edge coordinates, an edge coordinate position 1403 is determined. By performing similar computing processing over the whole captured images, the edge coordinate positions of patterns are computed for captured images of respective frequency patterns.

Computation of Edge Overlap Value

Figure 14:
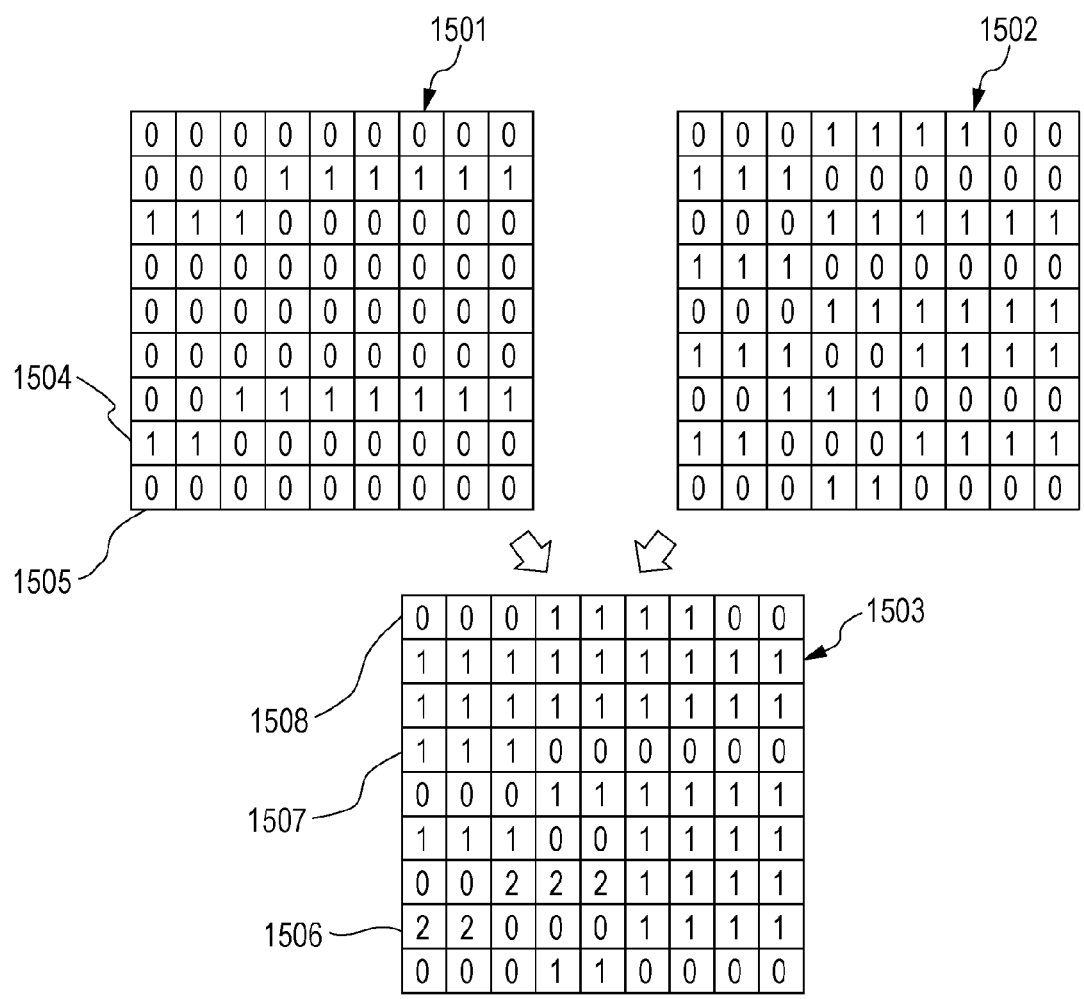
FIG. 14 illustrates computation of edge overlap.

FIG. 14 is a schematic diagram illustrating processing for computing an edge overlap value. Reference numeral 1501 denotes data indicating edge positions computed using the above-described method on the basis of an image obtained by capturing an N-bit projection pattern. Reference numeral 1502 denotes data representing edge positions similarly computed on the basis of an image obtained by capturing an (N+1)-bit projection pattern. The data representing edge positions has a two-dimensional size similarly to a capturing screen.

When there is an edge in a portion corresponding to each pixel, the data shows "1" (1504), and when there are no edges, the data shows "0" (1505). A map 1503 illustrates, for each pixel, data which is the count of overlapping edges at a pixel, for the patterns of respective numbers of bits. The data shows "0" if there are no edges (1508), "1" if there is one edge (state in which there is no edge overlap) (1507), and "2" if there are two edges (state in which edges overlap) (1506).

When the number of overlapping edges is one, there are no edge overlap, and this corresponds to a position which allows correct measurement to be realized by a space encoding method, in principle. When the number of overlapping edges is two or more, there is edge overlap, and this corresponds to a position which is not considered to allow correct measurement to be realized by a space encoding method, in principle. As a result of the processing described above, the edge overlap values at respective pixel positions of a captured image can be computed.

An example of high-reliability distance value computing processing will now be described.

The high-reliability distance value computing unit 412 determines that the value of distance image data is reliable in an area in which the edge overlap value is one, and makes the distance image data in this area valid. On the other hand, when the edge overlap value is two or more, the high-reliability distance value computing unit 412 determines that the value of the distance image data has low reliability and makes the distance image data in this area invalid. In this manner, invalidation processing is performed for the portions where the distance image data has low reliability, and as a result, the highly reliable distance image data 413 can be generated.

As has been described above, in the present embodiment, on the basis of captured images at the time of projecting the multiple-frequency slit-shaped light patterns 500 to 505 having no overlapping edge positions onto the object 601, the edge portions of the slit-shaped light patterns are identified on the basis of respective captured images. When the edge portions overlap in the captured images of two or more slit-shaped light patterns, the reliability of the computed distance values of the positions corresponding to the edges is lowered. Hence, at the time of measuring the three-dimensional shape of an object using a space encoding method, portions at the measured points influenced by noise or indirect light can be identified as portions where incorrect distance computing has been performed, without increasing the number of projecting slit-shaped light patterns. As a result, the measurement of the three dimensional shape of an object can be made at high speed with high accuracy.

Second Embodiment

A second embodiment of the present invention will now be described. In the first embodiment, an example of the case in which the distance image data corresponding to an area having an edge overlap value of two or more is invalidated has been described. However, in the present embodiment, when the edge overlap value is two or more, a Gray code is configured using slit-shaped light patterns with a number of bits up to the number of bits of the highest frequency of slit-shaped light patterns minus the edge overlap value, thereby forming distance image data. In this manner, the present embodiment is different from the first embodiment mainly in part of the method of computing (or employing) distance image data.

Hence, in the description of the present embodiment, portions which are the same as those of the first embodiment are, for example, denoted by the same reference numerals illustrated in FIGS. 1 to 11, and the detailed description thereof is omitted.

It is an object of the present embodiment to compute distance image data at more positions than in the first embodiment although accuracy is lower than in the first embodiment, by using edge overlap values computed by the edge overlap computing unit 410 in the distance computing process performed by the distance value computing unit 411. That is, distance measurement is performed using reliable projection results of a low-frequency slit-shaped light pattern by interpreting the overlap values in the following manner.

First, when the edge overlap value is one, distance computation is performed by forming a Gray code using slit-shaped light patterns of all the frequencies.

On the other hand, when the edge overlap value is two or more, distance computation is performed by forming a Gray code using slit-shaped light patterns with numbers of bits up to a value given by (number of bits of the maximum frequency of slit-shaped light patterns minus the edge overlap value).

This is because a low-frequency slit-shaped light pattern has a greater light amount than a high-frequency slit-shaped light pattern, and as a result, provides a higher signal to noise ratio (S/N ratio) in the computation results than a high-frequency slit-shaped light pattern. In other words, even if the edge overlap value is two or more, when the edge overlap value is relatively small, the computation results based on a low-frequency slit-shaped light pattern is used relatively more frequently, and when the edge overlap value is relatively large, the computation results based on a low-frequency slit-shaped light pattern is used relatively less frequently.

In this manner, the distance image data can be computed for more positions than in the first embodiment.

Note that another configuration may be employed in which the distance value computing unit 411 obtains all the distance image data and the high-reliability distance value computing unit 412 determines whether or not the sub-pixel values of overlapping edge positions are the same and recomputes the distance computation values with an edge overlap value of two or more in accordance with the determination results.

Third Embodiment

Next, a third embodiment will be described. In this embodiment, even if the edge overlap value is two or more, when the edge positions obtained with sub-pixel accuracy are not completely the same, distance image data at this position is computed (or employed). In this manner, the present embodiment is different from the first or second embodiment mainly in part of the method of computing (or employing) distance image data. Hence, in the description of the present embodiment, portions which are the same as those of the first or second embodiment are, for example, denoted by the same reference numerals illustrated in FIGS. 1 to 11, and the detailed description thereof is omitted.

In the present embodiment, the edge overlap values computed by the edge overlap computing unit 410 and the edge coordinates (sub-pixel value) computed by the sub-pixel computing unit 409 are used in the distance computing process performed by the distance value computing unit 411. Thereby, distance image data based on projection of a high-frequency slit-shaped light pattern can be computed, which is not possible in the first or second embodiment.

An area (pixel) having an edge overlap value of two or more is thought to be in a state in which the edge position of a low-frequency slit-shaped light pattern and the edge position of a high-frequency slit-shaped light pattern exist in the same pixel of the camera 113. In other words, an area (pixel) having an edge overlap value of two or more occurs also when the resolution of edge positions is higher than the pixel resolution of the camera 113.

In this case, the edge positions can be computed with sub-pixel resolution by the sub-pixel computing unit 409, by using the luminance of slit-shaped light patterns of respective frequencies. Hence, the edge positions can be computed in a greater level of detail than the units of the pixels of the camera 113.

In other words, in the case in which the edge overlap value is two or more, the distance value computing unit 411 determines whether or not the sub-pixel values of the overlapping edge positions are the same. When the sub-pixel values of the overlapping edge positions are determined to be not the same, the distance value computing unit 411 computes a distance to an object corresponding to the edge positions. In this manner, the present embodiment realizes higher-accuracy distance computation than the first and second embodiments, enabling high-accuracy measurement of the three-dimensional shape of an object.

Note that, by making the distance value computing unit 411 obtain all the distance image data, the high-reliability distance value computing unit 412 may determine whether or not the pixel values of overlapping edge positions are the same and, when they are the same, clear the computed distance values corresponding to the edge position.

In the embodiments described above, for example, the projector 112 realizes an exemplary projector, the camera 113 realizes an exemplary image capturing unit. Further, for example, the distance value computing unit 411 realizes an exemplary distance value computing unit, and the edge computing unit 407 realizes an exemplary edge computing unit. Further, the edge overlap computing unit 410 realizes an exemplary edge overlap degree detecting unit, and at least one of the distance value computing unit 411 and the high-reliability distance value computing unit 412 realizes an exemplary position detection reliability computing unit. In addition, an edge overlap value of two is an exemplary reference of the reliability of distance in the position of an edge.

The embodiments described above illustrate only specific examples for realizing the present invention, and should not be interpreted as limiting the technical scope of the present invention. In other words, the present invention can be realized in various forms without departing from the technical concept or major features of the invention.

Fourth Embodiment

In a fourth embodiment, in the distance computing process performed by the distance value computing unit 411, by using the edge overlap values obtained by the edge overlap computing unit 410, the distance values are computed without making distance values be invalid, although accuracy becomes low compared with the first embodiment.

In the first embodiment, when an edge overlap value computed by the edge overlap computing unit 410 is two or more, the corresponding distance value is processed as an unreliable measured distance value. In the present embodiment, distance measurement is performed using reliable low-frequency slit-shaped light patterns, by interpreting the edge overlap value as follows:

(1) When the edge overlap value is one, distance computation is performed by forming a Gray code using projection patterns of all the frequencies.

(2) When the edge overlap value is two or more, distance computation is performed by forming a Gray code using projection patterns with numbers of bits up to a value given by (number of bits of the maximum frequency of projection patterns minus the edge overlap value).

This is because a low-frequency slit-shaped light pattern has a greater light amount than a high-frequency slit-shaped light pattern, and as a result, provides a higher signal to noise ratio (S/N ratio) in the computation results than a high-frequency slit-shaped light pattern. Due to the above-described processing, the present embodiment allows computation of distance image data to be performed for more positions than in the first embodiment.

Fifth Embodiment

In a fifth embodiment, in the distance computing process performed by the distance value computing unit 411, by using edge overlap values obtained by the edge overlap computing unit 410 and sub-pixel values obtained by the sub-pixel computing unit 409, distance image data which is not computed in other embodiments is computed on the basis of the results of projecting high-frequency slit-shaped light patterns. An image pixel having an edge overlap value of two or more is thought to be in a state in which the edge position of a low-frequency slit-shaped light pattern and the edge position of a high-frequency slit-shaped light pattern exist in the same pixel of a camera apparatus. In other words, this also occurs when the resolution of edge positions is higher than the pixel resolution of the camera apparatus.

In this case, the edge positions can be computed with sub-pixel resolution by the sub-pixel computing unit 409, by using the luminance of slit-shaped light patterns of respective frequencies. As a result, edge positions can be computed with higher resolution than the units of pixels of a camera apparatus. In other words, as a result of the distance value computing unit 411 computing distances to an object by using also the sub-pixel values of edge positions when the edge overlap value is two or more, computation of distances with higher accuracy than in other embodiments is possible.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus comprising:
   a protection unit configured to protect a plurality of patterns having a light and dark stripe portion onto an object;
   an obtaining unit configured to obtain a plurality of capture images of an object onto which each pattern is projected by the projection unit;
   an edge position detecting unit configured to detect an edge which indicates a boundary between light and dark portions of each pattern in each captured image;
   a counting unit configured to count a number of an edge pixel including the detected edge at a corresponding position in each captured image;
   a determination unit configured to determine a number of the detected edge pixels counting by the counting unit in the corresponding position in each captured image is one; and
   a deriving unit configured to derive a position of the object based on the edge positions and a result of determination by the determination unit.

2. The apparatus according to claim 1, wherein the pattern is a Gray code.

3. The apparatus according to claim 1, wherein the deriving unit derives the position of the object based on a pixel at the corresponding position, in the captured image, in which the number of edge pixels is determined to be one by the determination unit.

4. The apparatus according to claim 1, wherein the deriving unit does not use a pixel at the corresponding position, in the captured image, in which the number of edges is not determined to be one by the determination unit for the object.

5. The apparatus according to claim 1, wherein the edge position detecting unit, when the number of edge pixels is not one, detects the edge position of the light and dark stripe pattern through sub-pixel processing.

6. The apparatus according to claim 1, further comprising a reliability obtaining unit configured to obtain reliability of deriving the position of the object based on the number of the edge pixels.

7. The apparatus according to claim 6, wherein the reliability obtaining unit does not output the position in which the reliability is below a reference.

8. The apparatus according to claim 6, wherein the reliability obtaining unit determines each width of the light and dark stripe portion based on the reliability.

9. A method comprising:
   a projecting step of projecting a plurality of patterns having a light and dark stripe portion onto an object;
   an obtaining step of obtaining a plurality of captured images of an object onto which each pattern is projected;
   an edge position detecting step of detecting an edge which indicates a boundary between light and dark portions of each pattern in each captured image;
   a counting step of counting a number of an edge pixel including the detected edge at a corresponding position in each captured image;
   a determination step of determining a number of the detected edge pixels counted by the counting step in the corresponding position in each captured image is one; and
   a deriving step of deriving a position of the object based on the edge positions and a result of determination by the determination step.

10. A non-transitory computer readable memory medium containing a computer program for causing a computer to execute:
    a projecting step of projecting a plurality of patterns having a light and dark stripe portion onto an object;
    an obtaining step of obtaining a plurality of captured images of an object onto which each pattern is projected;
    an edge position detecting step of detecting an edge which indicates a boundary between light and dark portions of each pattern in each captured image;
    a counting step of counting a number of an edge pixel including the detected edge at a corresponding position in each captured image;
    a determination step of determining a number of the detected edge pixels counted by the counting step in the corresponding position in each captured image is one; and
    a deriving step of deriving a position of the object based on the edge positions and a result of determination by the determination step.

11. An apparatus comprising:
    a projection unit configured to project a plurality of patterns having a light and dark stripe portion onto an object;
    an obtaining unit configured to obtain a plurality of captured images of an object onto which each pattern is projected by the projection unit;
    an edge detecting unit configured to detect a position of an edge which indicates a boundary between light and dark portions of each pattern in each captured image;
    a determination unit configured to determine whether a plurality of edges is detected in a pixel which is at the same position in each captured image; and
    a deriving unit configured to derive a position of the object based on the detected position of the edge and a result of determination by the determination unit.

12. The apparatus according to claim 11, wherein the-pattern is a Gray code.

13. The apparatus according to claim 11, wherein the deriving unit is configured to, in a case where the determination unit determines that a plurality of edges is detected in a pixel which is at the same position in each captured image, derive a position of the object based on only a position of an edge in a pixel in which the determination unit does not determine that a plurality of pixels is detected.

14. The apparatus according to claim 11, wherein the deriving unit is configured to, in a case where the determination unit determines that a plurality of edges is detected in a pixel which is at the same position in each captured image, not use positions of the plurality of edges detected in the determined pixel for deriving a position of the object.

15. The apparatus according to claim 11, wherein the edge detecting unit detects the edge through sub-pixel processing when a plurality of edges is detected in a pixel which is at the same position in each captured image.

16. A method comprising:
a projecting step of projecting a plurality of patterns having a light and dark stripe portion onto an object;
an obtaining step of obtaining a plurality of captured images of an object onto which each pattern is projected by the projection unit;
an edge detecting step of detecting a position of an edge which indicates a boundary between light and dark portions of each pattern in each captured image;
a determination step of determining whether a plurality of edges is detected in a pixel which is at the same position in each captured image; and
a deriving step of deriving a position of the object based on the detected position of the edge and a result of determination by the determination step.

17. A non-transitory computer readable memory medium containing a computer program for causing a computer to execute:
a projecting step of projecting a plurality of patterns having a light and dark stripe portion onto an object;
an obtaining step of obtaining a plurality of captured images of an object onto which each pattern is projected by the projection unit;
an edge detecting step of detecting a position of an edge which indicates a boundary between light and dark portions of each pattern in each captured image;
a determination step of determining whether a plurality of edges is detected in a pixel which is at the same position in each captured image; and
a deriving step of deriving a position of the object based on the detected position of the edge and a result of determination by the determination step.

18. An apparatus comprising:
a projection unit configured to project a plurality of patterns having a light and dark stripe portion onto an object;
an obtaining unit configured to obtain a plurality of captured images of an object onto which each pattern is projected by the projection unit;
an edge position detecting unit configured to detect a position of edge which indicates a boundary between light and dark portions of each pattern in each captured image;
a determination unit configured to determine whether a position of a pixel including an edge detected in a first image among the plurality of captured images is overlapped with a position of a pixel including an edge detected in a second image different from the first image; and
a deriving unit configured to derive a position of the object based on the detected position of the edge and a result of determination by the determination unit.

19. The apparatus according to claim 18, wherein the-pattern is a Gray code.

20. The apparatus according to claim 18, wherein the deriving unit is configured to, in a case where the determination unit determines that a position of a pixel including an edge detected in a first image among the plurality of captured images is overlapped with a position of a pixel including an edge detected in a second image different from the first image, derive a position of the object based on only a position of an edge detected in a pixel of which the determination unit does not determine that a position is overlapped.

21. The apparatus according to claim 18, wherein the deriving unit is configured to, in a case where the determination unit determines that a position of a pixel including an edge detected in a first image among the plurality of captured images is overlapped with a position of a pixel including an edge detected in a second image different from the first image, not use the position of the edge detected in the pixel of which the determination unit determines that a position is overlapped, for deriving a position of the object.

22. The apparatus according to claim 18, wherein the edge detecting unit detects the edge through sub-pixel processing when the determination unit determines that a position of a pixel including an edge detected in a first image among the plurality of captured images is overlapped with a position of a pixel including an edge detected in a second image different from the first image.

23. A method comprising:
a projection step of projecting a plurality of patterns having a light and dark stripe portion onto an object;
an obtaining step of obtaining a plurality of captured images of an object onto which each pattern is projected by the projection step;
an edge position detecting step of detecting a position of edge which indicates a boundary between light and dark portions of each pattern in each captured image;
a determination step of determining whether a position of a pixel including an edge detected in a first image among the plurality of captured images is overlapped with a position of a pixel including an edge detected in a second image different from the first image; and
a deriving step of deriving a position of the object based on the detected position of the edge and a result of determination by the determination step.

24. A non-transitory computer readable memory medium containing a computer program for causing a computer to execute:
a projection step of projecting a plurality of patterns having a light and dark stripe portion onto an object;
an obtaining step of obtaining a plurality of captured images of an object onto which each pattern is projected by the projection step;
an edge position detecting step of detecting a position of edge which indicates a boundary between light and dark portions of each pattern in each captured image;
a determination step of determining whether a position of a pixel including an edge detected in a first image among the plurality of captured images is overlapped with a position of a pixel including an edge detected in a second image different from the first image; and a deriving step of deriving a position of the object based on the detected position of the edge and a result of determination by the determination step.

25. An apparatus comprising:
a projection unit configured to project a pattern having a light and dark stripe portion onto an object;
an obtaining unit configured to obtain a captured image of an object onto which the pattern is projected by the projection unit;
an edge detecting unit configured to detect an edge which indicates a boundary between light and dark portions of the pattern in the captured image;
a determination unit configured to determine a plurality of edges is detected by the edge position detecting unit in the same pixel in the captured image; and
a deriving unit configured to derive a position of the object based on positions of the detected edges and a result of determination by the determination unit.

26. The apparatus according to claim 25, wherein the-deriving unit is configured to, in a case where the determination unit determines that a plurality of edges is detected in a same pixel, derive a position of the object based on only positions of the edges detected in pixels except for the same pixel.

27. The apparatus according to claim 25, wherein the deriving unit is configured to, in a case where the determination unit determines that a plurality of edges is detected in a same pixel, not use the positions of the edges detected in the same pixel for deriving the position of the object.

28. A method comprising:
a projection step of projecting a pattern having a light and dark stripe portion onto an object;
an obtaining step of obtaining a captured image of an object onto which the pattern is projected by the projection unit;
an edge detecting step of detecting an edge which indicates a boundary between light and dark portions of the pattern in the captured image;
a determination step of determining a plurality of edges is detected by the edge position detecting unit in the same pixel in the captured image; and
a deriving step of deriving a position of the object based on positions of the detected edges and a result of determination by the determination step.

29. A non-transitory computer readable memory medium containing a computer program for causing a computer to execute:
a projection step of projecting a pattern having a light and dark stripe portion onto an object;
an obtaining step of obtaining a captured image of an object onto which the pattern is projected by the projection unit;
an edge detecting step of detecting an edge which indicates a boundary between light and dark portions of the pattern in the captured image;
a determination step of determining a plurality of edges is detected by the edge position detecting unit in the same pixel in the captured image; and
a deriving step of deriving a position of the object based on positions of the detected edges and a result of determination by the determination step.

* * * * *